United States Patent
Liou

(10) Patent No.: US 6,209,767 B1
(45) Date of Patent: Apr. 3, 2001

(54) DEVICE FOR HOLDING SECURELY A MOBILE PHONE DIALING DEVICE ON THE STEERING WHEEL OF A MOTOR VEHICLE

(75) Inventor: Yi-Chaung Liou, Taichung (TW)

(73) Assignee: Merry Electronics Co., Ltd., Taichung (TW)

( * ) Notice: Subject to any disclaimer, the term of this patent is extended or adjusted under 35 U.S.C. 154(b) by 0 days.

(21) Appl. No.: 09/377,072

(22) Filed: Aug. 19, 1999

(51) Int. Cl.$^7$ ........................................................ B60R 7/00
(52) U.S. Cl. ........................ 224/276; 224/547; 224/572; 224/929; 248/205.2; 248/310; 248/316.8
(58) Field of Search ........................................ 224/276, 929, 224/572, 547; 248/205.2, 309.1, 310, 316.8

(56) References Cited

U.S. PATENT DOCUMENTS

| | | | |
|---|---|---|---|
| 4,698,838 | * | 10/1987 | Ishikawa et al. ................ 224/929 X |
| 4,850,015 | * | 7/1989 | Martin .............................. 379/428 |
| 4,917,130 | * | 4/1990 | Sweder ........................... 224/276 X |
| 5,056,822 | * | 10/1991 | Shim ............................... 224/276 X |
| 5,988,572 | * | 11/1999 | Chivallier ....................... 224/929 X |

* cited by examiner

Primary Examiner—Stephen K. Cronin
(74) Attorney, Agent, or Firm—Browdy and Neimark

(57) ABSTRACT

A device is designed to hold securely a mobile phone dialing device on the steering wheel of an automotive vehicle. The device is formed of a locating member and a restraining member. The locating member is provided at one end thereof with a connection portion for connecting the mobile phone dialing device, and at other end thereof with an arcuate recess corresponding in radian to the steering wheel. The arcuate recess makes an intimate contact with the steering wheel. The restraining member enables the locating member to be detachably fastened with the steering wheel of the automotive vehicle.

6 Claims, 5 Drawing Sheets

DEVICE FOR HOLDING SECURELY A MOBILE PHONE DIALING DEVICE ON THE STEERING WHEEL OF A MOTOR VEHICLE

FIELD OF THE INVENTION

The present invention relates generally to an automotive accessory, and more particularly to a device designed to hold securely a mobile phone dialing device on the steering wheel of a motor vehicle to facilitate the dialing of the mobile phone by a driver operating the motor vehicle.

BACKGROUND OF THE INVENTION

As shown in FIG. 1, a prior art device for holding a mobile phone comprises a main body 1, which is fixed on the dashboard of an automobile. The main body 1 is provided at the bottom thereof with a plate 2 on which a mobile phone 4 is placed. The main body 1 is further provided with two holding blocks 3 opposite in location to each other for confining the mobile phone 4. When a driver of the automobile in operation wants to dial the phone, he or she must take the mobile phone 4 out of the prior art device. In dialing the mobile phone 4, he or she must use one hand to hold the phone 4 and other hand to dial the phone 4. It is conceivable that the driver in question is in danger of an accident.

SUMMARY OF THE INVENTION

It is therefore the primary objective of the present invention to provide a device for holding securely a mobile phone dialing device on the steering wheel of an automotive vehicle, thereby freeing both hands of a driver of the automotive vehicle to steer the automotive vehicle.

It is another objective of the present invention to provide a device which can be fastened easily and detachably with the steering wheel of a motor vehicle for holding a mobile phone dialing device.

In keeping with the principle of the present invention, the foregoing objectives of the present invention are attained by a device comprising a locating member and a restraining member. The locating member is provided at one end thereof with a connection portion for connecting a mobile phone dialing device, and at other end thereof with an arcuate recess corresponding in radian to the edge of the steering wheel. The locating member is attached to the steering wheel in conjunction with the restraining member. The restraining member is preferably formed of a retaining piece and an adhesive strap having a male retaining portion and a female retaining portion engageable with the male retaining portion.

The foregoing objectives, features, functions, and advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
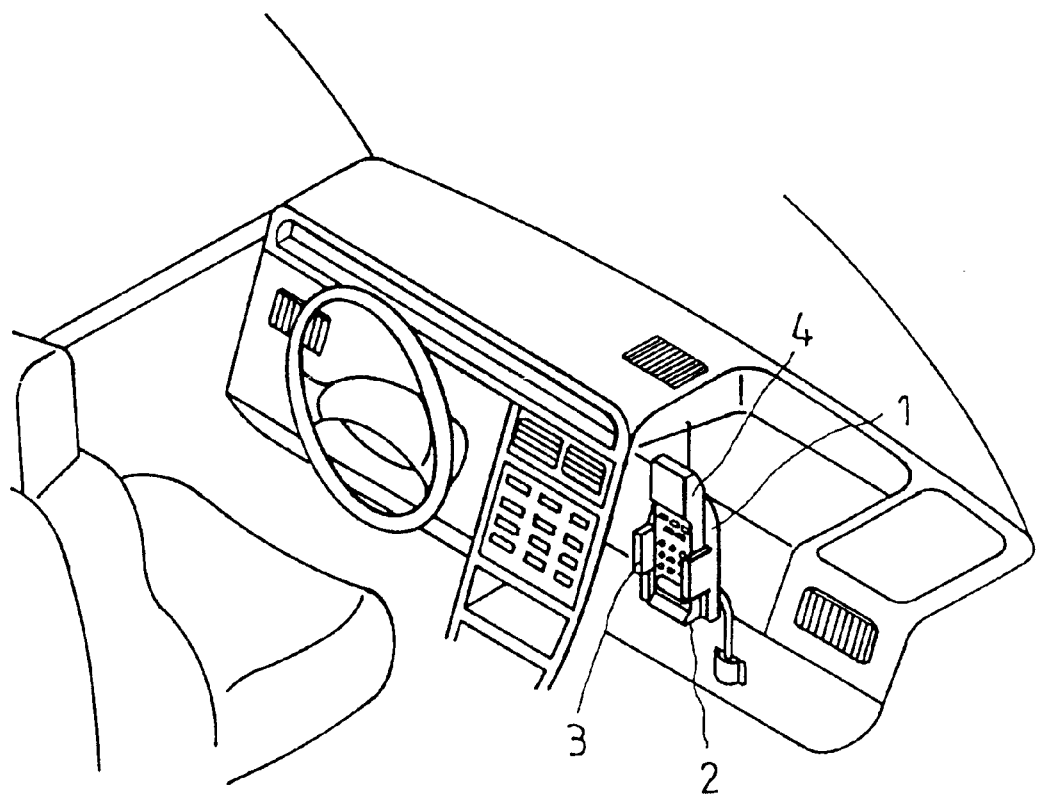
FIG. 1 shows a schematic view of a prior art device for holding a mobile phone in a motor vehicle.
Figure 2:
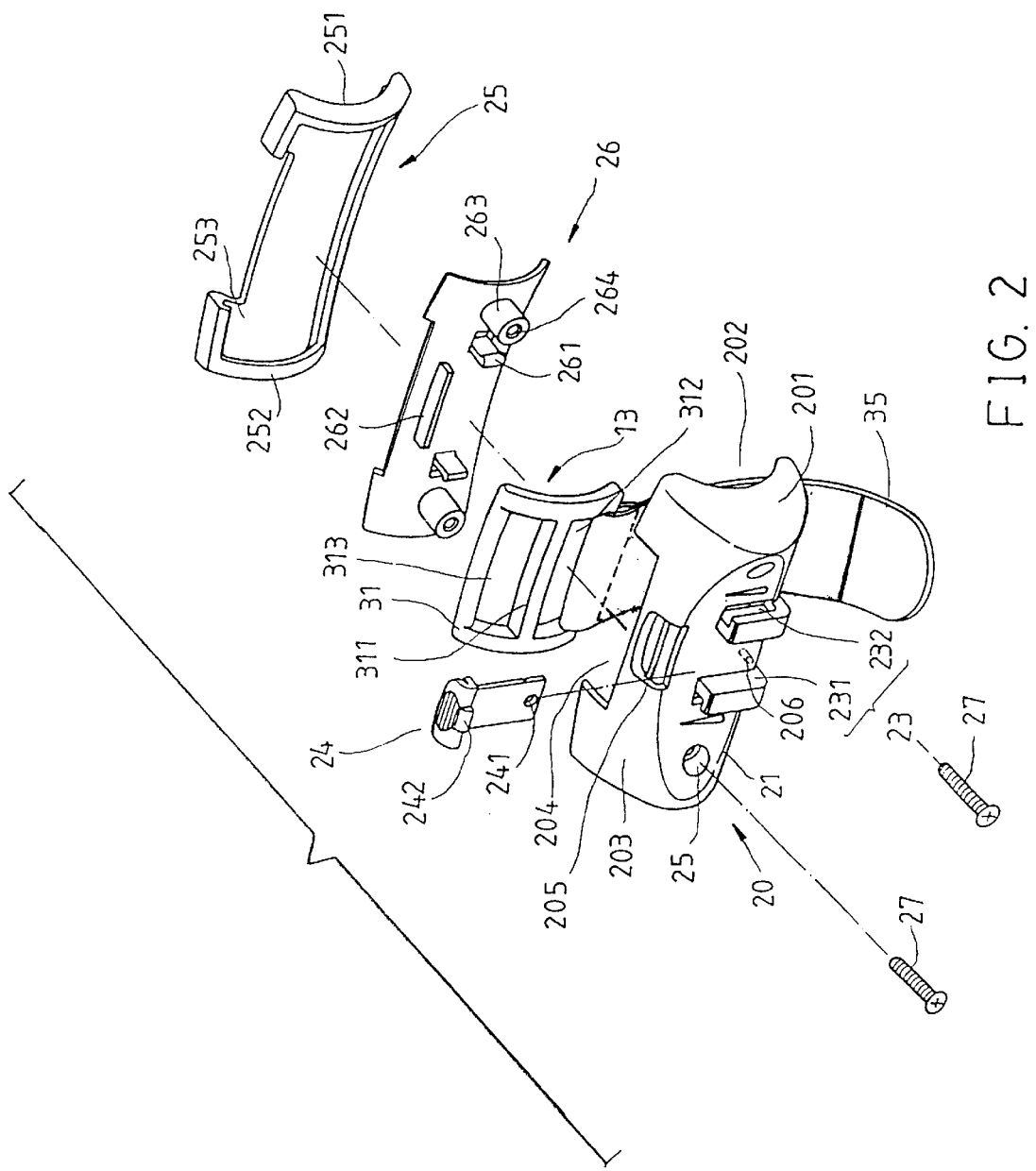
FIG. 2 shows an exploded view of a preferred embodiment of the present invention.
Figure 3:
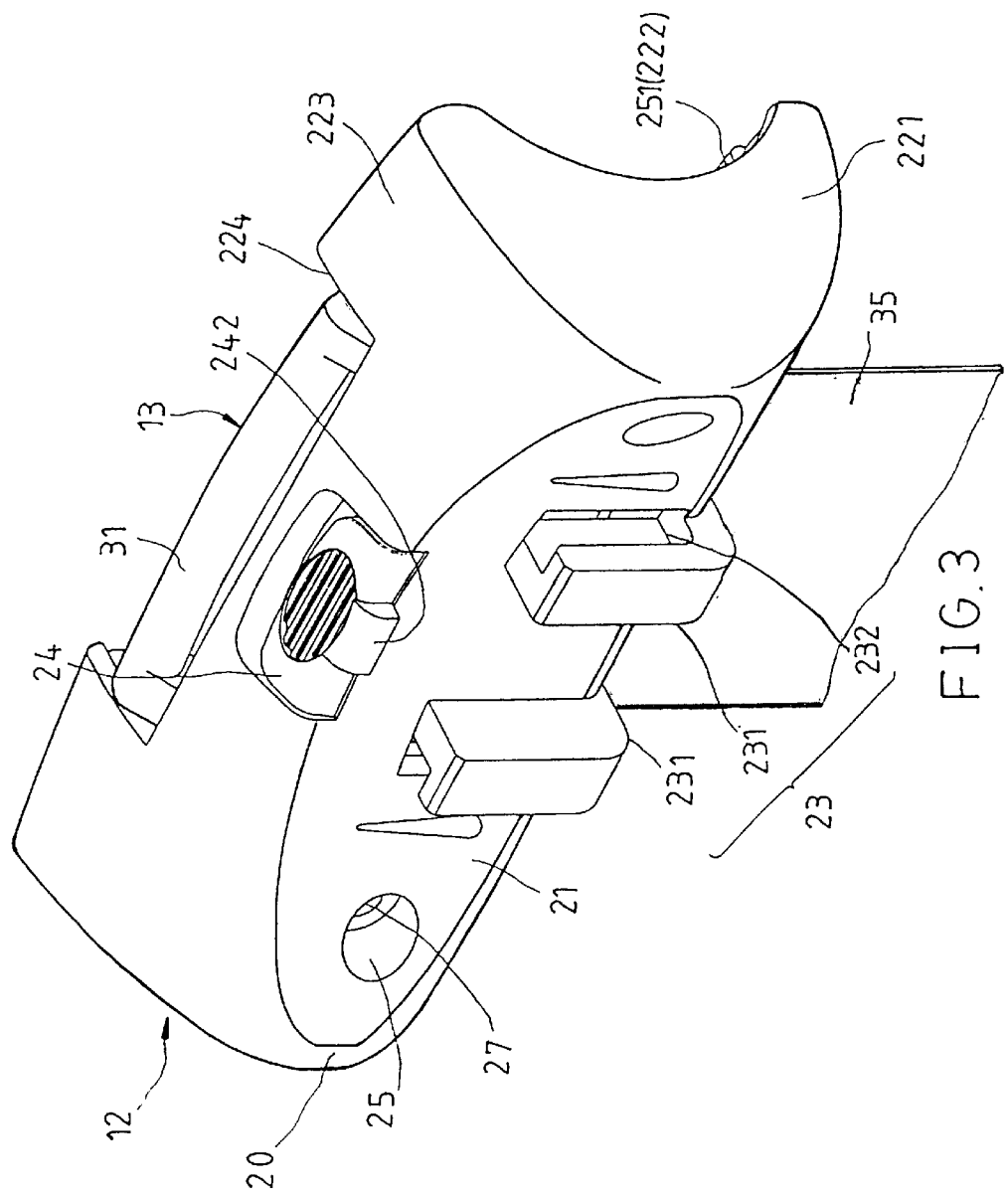
FIG. 3 shows a perspective view of the preferred embodiment of the present invention in combination.
Figure 4:
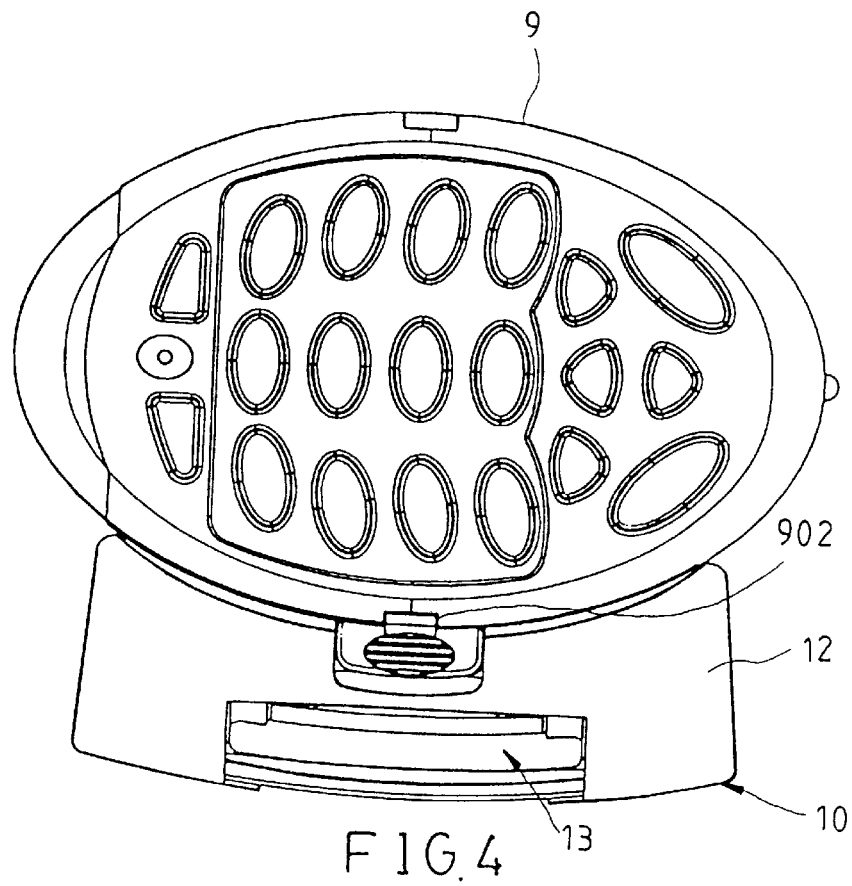
FIG. 4 shows a schematic plan view of the preferred embodiment of the present invention.

As shown in all drawings provided herewith, a holding device 10 embodied in the present invention comprises a locating member 12 and a restraining member 13.

The locating member 12 comprises a front shell cover 20 having a closed end and an open end. The closed end is provided with an arcuate recess 21 corresponding in shape to a mobile phone dialing device. The arcuate recess 21 is provided in the center thereof with a connection portion 23 which is provided in two sides thereof with two round holes 25, and two parallel pillars 231, two retaining slots 232 for locating the two pins of a mobile phone dialing device 9 of an oval shape. The front shell cover 20 is provided in left and right side pieces 201 thereof with an arcuate recessed portions 202, and in up and down pieces 203 thereof with two inverted U-shaped slots 204. The up piece 203 is provided with a hole 205 into which a retaining member 24 is inserted. The retaining member 24 is rectangular and is provided at one end thereof with a hole 241 for receiving a bolt 206 to fasten the retaining member 24. The retaining member 24 is provided at other end thereof with a protruded portion 242, which is inserted into a recess 902 of the mobile phone dialing device 9 at the time when two retaining pins 901 of the mobile phone dialing device 9 are inserted into the two retaining slots 232 of the front shell cover 20. As the protruded portion 242 is pressed, the mobile phone dialing device 9 is relieved of the pressing action and can be thus taken upwards.

The locating member 12 further comprises a rear shell plate 25 of a curved construction, which is joined at the front end thereof with the arcuate recessed portion 202 of the front shell cover 20. The rear shell plate 25 is provided at the bottom end thereof with an arcuate portion 251 corresponding in radian to the arcuate edge of a steering wheel 8. In other words, the arcuate portion 251 is in an intimate contact with the steering wheel 8. The rear shell plate 25 is provided in the periphery thereof with a protruded edge 252 which is in turn provided with a circular slot 253.

The locating member 12 further comprises a connection plate 26 made of a rigid plastic material. The connection plate 26 is of a curved construction and is provided with two L-shaped hooks 261 which are provided with a stop piece 262, and two round pillars 263 which are in turn provided with a threaded hole 264 engageable with a bolt 27. The connection plate 26 is smaller than the rear shell plate 25 and is located in the circular slot 253 of the rear shell plate 25.

Figure 6:
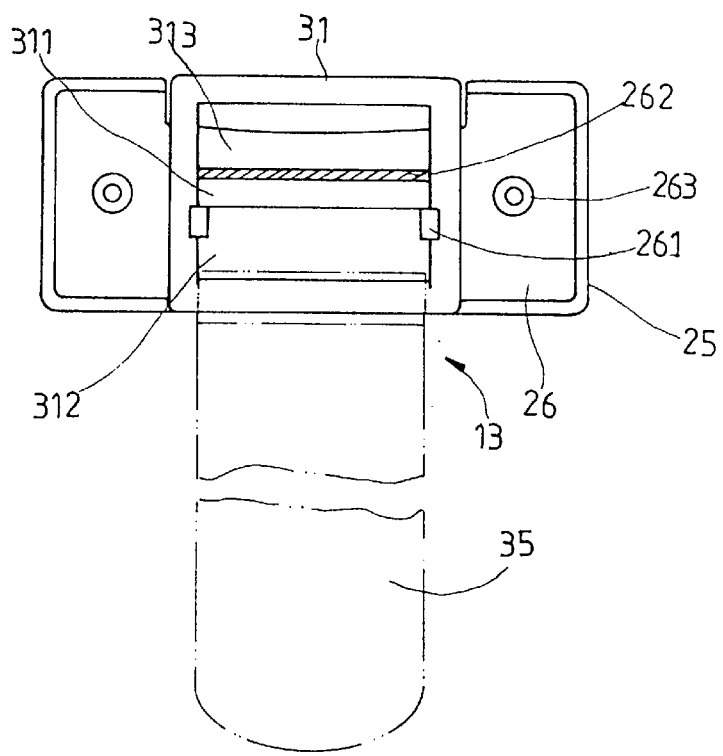
FIG. 6 shows another schematic plan view of the preferred embodiment of the present invention.

The restraining member 13 is formed of a retaining piece 31 and a strap 35. The retaining piece 31 is rectangular and is provided with a cross rod 311 and two frame holes 312, 313. When the retaining piece 31 is placed on the connection plate 26, two sides of the frame hole 312 are caught by the hooks 261 of the connection plate 26. In the meantime, the end of the cross rod 311 presses against the stop piece 262 of the connection plate 26. When the connection plate 26 and the rear shell plate 25 are mounted on the front shell cover 20, two sides of the retaining piece 31 are exposed through the slots 204 of the front shell cover 20, as shown in FIG. 6. The strap 35 is an adhesive retaining strap having a male retaining portion and a female retaining portion. One end of the strap 35 is put through the frame hole 311 of the retaining piece 31. The strap 35 is put through a slot 222 of the front shell cover 20 to circumvent the steering wheel 8. Other end of the strap 35 is put through the frame hole 313 of the retaining piece 31 via another slot 222 of the front shell cover 20.

Figure 5:
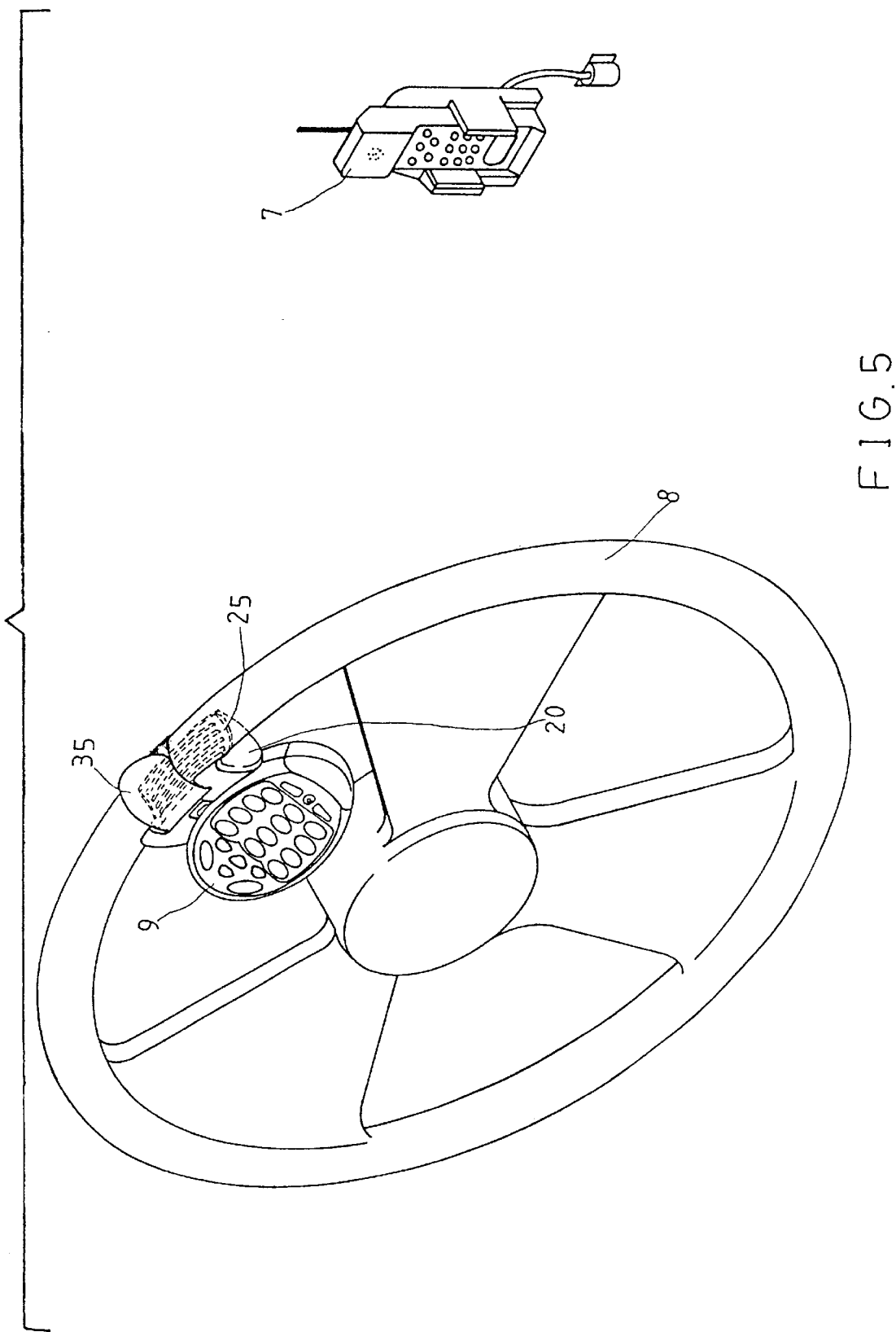
FIG. 5 shows a schematic view of the preferred embodiment of the present invention at work.

As shown in FIG. 5, the device 10 of the present invention is disposed in the inner side of the steering wheel 8 such that the arcuate portion 251 of the rear shell plate 25 of the locating member 12 is attached to the steering wheel 8, and that the strap 35 of the restraining member 13 is put through the frame hole 313 of the retaining piece 31 before the male retaining portion is joined with the female retaining portion. The mobile phone dialing device 9 is thus located such that the two retaining pins 901 of the mobile phone dialing device 9 are inserted into the two retaining slots 232 of the connection portion 23 of the front shell cover 20. The mobile phone dialing device 9 is a voice control receiver, which is remotely controlled by infrared rays along with a mobile phone set 7 which is located on the dashboard of the motor vehicle. The mobile phone dialing device 9 is located on the steering wheel 8 of the motor vehicle.

In light of the mobile phone dialing device 9 being operated by voice of a driver of the motor vehicle, both hands of the driver are free to steer the motor vehicle while the driver is dialing. As a result, the driver is less vulnerable to traffic accident.

The device 10 of the present invention can be detached from the steering wheel 8 by relieving the steering wheel 8 of the restraining action of the strap 35. The locating member 12 can be then removed from the steering wheel 8. The mobile phone dialing device 9 can be easily located on the locating member 12 by inserting the retaining pins 901 of the mobile phone dialing device 9 into the retaining slots 232 of the connection portion 23 of the locating member 12. In the meantime, the retaining member 24 is inserted into the recessed portion 902 of the mobile phone dialing device 9. The mobile phone dialing device 9 can be taken out of the device 10 by pressing the retaining member 24 to free the mobile phone dialing device 9.

The embodiment of the present invention described above is to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A device for holding securely a mobile phone dialing device on the steering wheel of a motor vehicle, said device comprising:

a locating member provided at one end thereof with a connection portion for connecting the mobile phone dialing device, said locating member further provided at other end thereof with an arcuate recess corresponding in radian to the steering wheel whereby said arcuate recess makes an intimate contact with the steering wheel; and a restraining member enabling said locating member to be detachably fastened with the steering wheel wherein said locating member comprises:

a front shell cover having a closed end and an open end provided therein with a receiving space, said closed end provided with a connection portion having two parallel pillars and two retaining slots for locating two pins of the mobile phone dialing device whereby said open end is provided with two slots extending toward said closed end;

a rear shell plate joined with said open end of said front shell cover such that said open end is closed by said rear shell plate whereby said rear shell plate is provided with an arcuate recess corresponding in radian to the steering wheel;

said restraining member formed of a retaining piece and a strap, said retaining piece provided with two frame holes and disposed in said receiving space of said front shell cover such that two ends of said strap are put through said two frame holes and said two slots of said front shell cover to be fastened with the steering wheel.

2. The device as defined in claim 1, wherein said front shell cover further has a retaining member which is located at one end thereof by said front shell cover and is provided at other end thereof with a protruded portion whereby said protruded portion presses against the end portion of the mobile phone dialing device at such time when two retaining pins of the mobile phone dialing device are inserted into said two retaining slots of said front shell cover, the mobile phone dialing device being relieved of the pressing action of said protruded portion at the time when said protruded portion is pressed.

3. The device as defined in claim 2, wherein said closed end of said front shell cover is provided with an arcuate recess; and wherein said connection portion is disposed on said arcuate recess of said front shell cover.

4. The device as defined in claim 2, wherein said strap of said restraining member is an adhesive retaining strap; wherein one end of said adhesive retaining strap is put through one of said frame holes of said retaining piece such that said adhesive retaining strap is put through one of said slots of said front shell cover, and that other end of said adhesive retaining strap circumvents the steering wheel before being put through other one of said slots of said front shell cover and other one of said frame holes of said retaining piece so as to be adhered to said adhesive retaining strap.

5. The device as defined in claim 2, wherein said rear shell plate has a connection plate which is provided with two hooks for retaining and locating said retaining piece, and with two round pillars, each having a threaded hole; and wherein said front shell cover is provided with two round holes corresponding in location to said threaded holes, and with two bolts engaged with said two threaded holes via said two round holes.

6. The device as defined in claim 5, wherein said rear shell plate is provided in a periphery thereof with a circular slot for locating said connection plate which is inserted into said circular slot.

* * * * *